No. 709,932. Patented Sept. 30, 1902.
F. W. SCHOOLEY.
WIRE REEL TRUCK.
(Application filed Dec. 26, 1901.)

(No Model.) 2 Sheets—Sheet 1.

Witnesses:
S. C. Duvall.
R. E. Randle

Inventor:
FRANK W. SCHOOLEY;
by his attorney,
Robert W Randle

No. 709,932. Patented Sept. 30, 1902.
F. W. SCHOOLEY.
WIRE REEL TRUCK.
(Application filed Dec. 26, 1901.)
(No Model.) 2 Sheets—Sheet 2.

Witnesses:
S. C. Duvall.
R. G. Randle

Inventor:
FRANK W. SCHOOLEY,
by his attorney,
Robert W Randle

UNITED STATES PATENT OFFICE.

FRANK W. SCHOOLEY, OF DUBLIN, INDIANA, ASSIGNOR OF ONE-HALF TO BERT L. HIATT, OF DUBLIN, INDIANA.

WIRE-REEL TRUCK.

SPECIFICATION forming part of Letters Patent No. 709,932, dated September 30, 1902.

Application filed December 26, 1901. Serial No. 87,328. (No model.)

*To all whom it may concern:*

Be it known that I, FRANK W. SCHOOLEY, a citizen of the United States, residing at Dublin, in the county of Wayne and State of Indiana, have invented and produced new and useful Improvements in Wire-Reel Trucks, of which the following is a specification, reference being had to the accompanying drawings, forming a part thereof.

The object of this invention is to provide a strong, durable, and efficient device for facilitating the distribution of fence-wire along the line near where it is to be used in the construction of fences.

Another object is to provide a wire-reel, mounted in a novel manner on carrying-wheels, which will be neat and attractive in appearance, easy of operation, and which can be manufactured and sold at a comparatively low price; and still another object is to provide a device for carrying and distributing fence-wire, a reel mounted on carrying-wheels adapted to revolve independently, means for easily and quickly placing a bundle of wire on the reel ready for distribution without the necessity of uncoiling or rewinding the bundle of wire.

My invention relates to a wire carrying and distributing device; and the invention consists in the novel arrangement, construction, and combination of the several parts, more fully set forth hereinafter and specifically pointed out in the appended claims terminating this specification.

Other objects and advantages will appear from the following description and from the appended drawings, in which are shown the objects and advantages of my invention.

Figure 1:
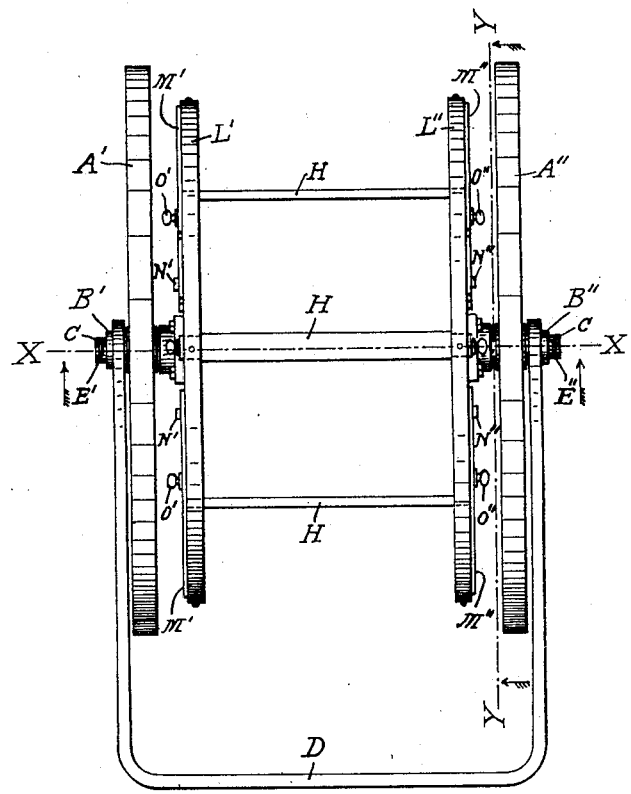
Figure 2:
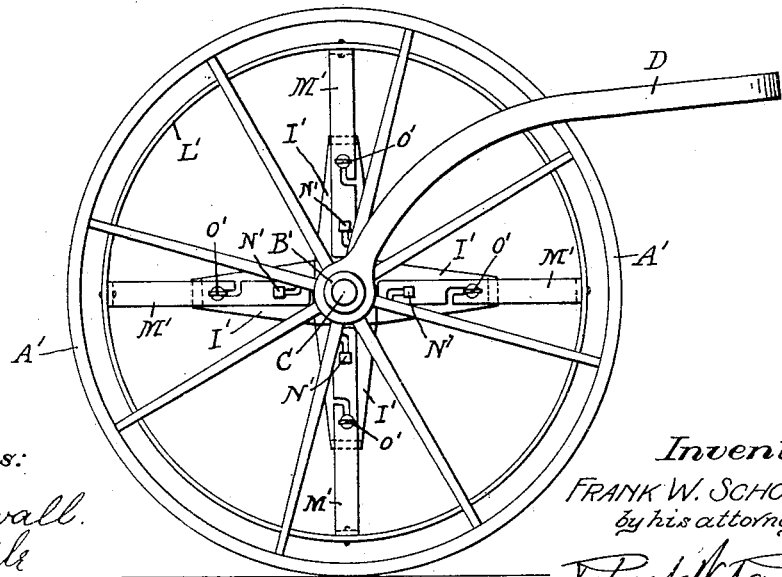
Figure 3:
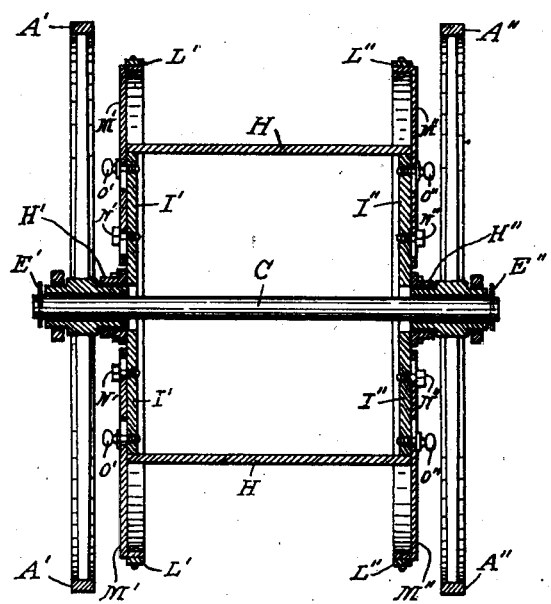
Figure 4:
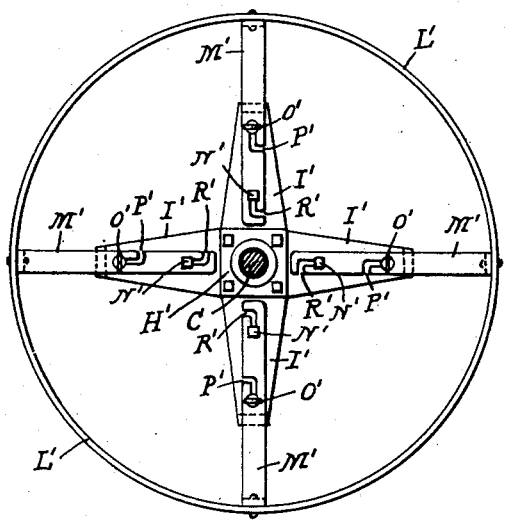
Figure 5:
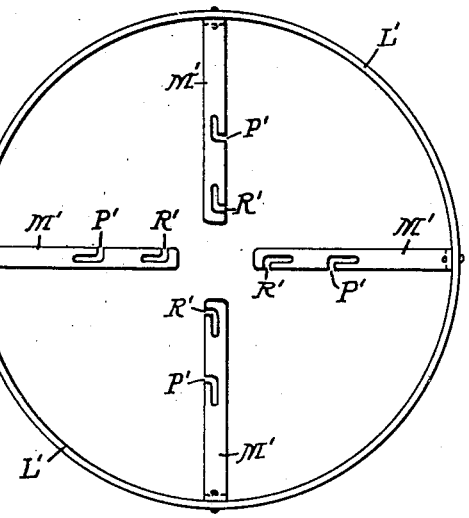

Referring now to the drawings, Figure 1 is a top plan view of my entire device. Fig. 2 is a side elevation of my invention. Fig. 3 is a sectional elevation thereof, taken on the line X X of Fig. 1. Fig. 4 is a detail elevation of the reel, showing guards attached, taken on the line Y Y of Fig. 1; and Fig. 5 is a detail view of the reel-guards removed from contact with the reel.

Similar letters refer to similar parts throughout the several views.

*The carriage mechanism.*—A' and A'' represent the two supporting and carrying wheels, each provided with a hub B' and B'', respectively, of novel construction. C represents the axle on which said wheels are mounted and on which they are adapted to revolve. D represents a frame preferably formed of a bar of spring metal, the central portion being intended to be used as a hand-hold, the outer portions being bent at right angles thereto and extending backward and downward in a curve, where the extreme ends are enlarged and are provided with holes which are adapted to receive the outer ends of the hubs B' and B'', as shown. The ends of the axle C are provided with two holes, in which are inserted the keys E' and E'', as shown.

*The reel mechanism.*—The reel proper is formed substantially as follows: H' and H'' represent the hubs of the reel, which are adapted to fit over and around the inner projections of the hubs B' and B'', respectively. Each of said hubs H' and H'' is provided with outwardly-projecting flanges, which provide means for securing thereto on each hub the four outwardly-projecting arms I' I' I' I' and I'' I'' I'' I'', respectively. Said arms extend outward at right angles to the axle C, as shown. Extending from the outer ends of each of the arms I' to the outer ends of each of the arms I'' at right angles thereto and lying parallel to the axle C are the four cross-pieces H.

By the above it is seen that I have provided a reel or spool adapted to revolve independently around the axle C, with its bearings journaled on the hubs B' and B'' of the main wheels.

*Reel-guards.*—L' represents a guard-band slightly smaller in circumference than the wheel A', with four guards M' secured thereto, projecting inward to near the center and an equal distance apart. Each of said guards M' is provided on one side with two slots P' and R', which are substantially of the form and proportions shown. Secured on the outer faces of each of the arms I' are two bolts or screws N' and O', the former being nearer the center and are stationary, and the latter being nearer the outer ends of I' and are provided with thumb-heads, whereby they can be tightened or loosened by hand. It can now be seen that should the guard-band L' be brought to surround the end of the reel, so that the four guards M' will lie parallel with and against the outer faces of the arms I', the slots P' and R' will come nearly opposite the bolts or screws N' and O'. The screws N' and O' should be turned to the left, so that their shoulders will be removed from the arms I' a distance slightly greater than the thickness of the guards M'. The guards M' are now secured to the arms I' by moving the guards M' so that the screws N' and O' will enter the slots P' and R' to their innermost extremity. The screws O' are now turned to the right until their shoulders tightly clamp the guards M' against the face of the arms I'. The guard-band L' being resilient, it can be seen that any point on the periphery of L' can be pressed inward toward the center for the purpose of causing the mouths of the slots P' and R' to come opposite the screws N' and O' for the purpose of engaging the screws N' and O' in the slots P' and R' in the manner shown.

I have just described the guards as applied to the left-hand side of the reel. It is apparent that guards consisting of similar parts and of same form and construction are to be used on the right-hand side of the reel in a similar manner, as indicated in Figs. 1 and 3, and both sets of guards are substantially as that shown in Figs. 4 and 5.

Fig. 5 shows the parts just described entirely detached from the reel, and it is apparent that these parts are adapted to be attached to either side of the reel interchangeably.

Operation: When my invention is constructed as herein shown and described and desiring to use the device, the operation is as follows: I remove the keys E' and E'' and then remove the frame D by spreading the ends outward until they are disconnected from the hubs and the axle. I then remove the wheel A' from the axle C. I then loosen the thumb-screws O' and pull outward and to the left on each of the guards M' one at a time, thus disconnecting them from the reel. When the above is accomplished, the roll of wire to be used can be placed on the reel resting on the four cross-pieces H. When this is done, I replace the guards, Fig. 5, on the end of the reel, as shown in Fig. 4. The wheel A' is then replaced and also the frame D, and, lastly, the keys E' and E'', and when this is completed the reel will appear as shown in Fig. 2 and is then ready for work. It is apparent that the roll of wire can be placed on the reel from either side and that the operation is substantially the same.

The device can be moved where desired, carried by the wheels A' and A'' and propelled by hand applied to the central portion of the frame D.

The outer end of the wire on the reel can be secured to some stationary object, and as the device is then propelled forward the wire will be withdrawn from the reel and will be laid along the ground where desired.

My invention is perfectly adapted to accomplish the results for which it is intended, and it is evident that changes in and modifications of the specific construction herein shown and described may be made and that analogous parts may be used to accomplish the same results without departing from the spirit of my invention or sacrificing any of its many advantages, and the specific construction of the details of my invention, in which novel features are embodied, may be variously changed without altering the essential principles which are claimed as new.

The terms "forward," "backward," "outward," and other similar terms are used for convenience of description, and it is not intended by their use to limit the arrangement and operation of the parts to the relative positions indicated.

Having now fully shown and described my invention and the best mode of its construction to me known at this time, what I claim as new, and desire to secure by Letters Patent of the United States, is—

1. In a wire-reel truck, the combination of a pair of wheels mounted on a common axle, each wheel being provided with a hub with an inward and an outward projecting flange, a wire-reel provided with hubs journaled on the inner flanges of the hubs of the wheels, removable guards to be attached to each side of the reel and secured thereto, a frame formed of one piece of material to provide a handhold and extending half-way around the truck with its ends journaled on the outer flanges of the hubs of the wheels, and keys passing through holes in each end of the axle, all substantially as shown and described and for the purposes set forth.

2. The reel formed of outwardly-projecting arms I' and I'' connected by the members H at right angles thereto and secured to the outer ends thereof, removable guards adapted to be secured to each side of the reel by screws N' and O' and N'' and O'', said guards consisting of the bands L' and L'' with arms M' and M'' projecting inward therefrom and each provided with two L-shaped slots to engage said screws in the reel, and hubs H' and H'' journaled on the inner flanges of the hubs of the drive-wheels.

3. In a wire-reel truck the combination of the axle, transporting-wheels mounted on the ends thereof, a reel mounted between said wheels and journaled on the hubs thereof, the U-shaped member D each end of which is journaled on the outer flange of one of the hubs, and keys E' and E'' for securing the mechanism on the axle C, all substantially as shown and described and for the purposes set forth.

In testimony whereof I have signed my name to this specification in the presence of two subscribing witnesses.

FRANK W. SCHOOLEY.

Witnesses:
 BERT L. HIATT,
 R. E. RANDLE.